United States Patent [19]

Seneker et al.

[11] Patent Number: 5,691,441
[45] Date of Patent: Nov. 25, 1997

[54] SPANDEX ELASTOMERS

[75] Inventors: Stephen D. Seneker, Sissonville; Bruce D. Lawrey, Charlestown, both of W. Va.

[73] Assignee: Arco Chemical Technology, L.P., Greenville, Del.

[21] Appl. No.: 728,922

[22] Filed: Oct. 11, 1996

[51] Int. Cl.⁶ .................. C08G 18/12; C08G 18/48; C07C 269/02
[52] U.S. Cl. .................. 528/61; 528/64; 528/76; 528/77; 528/906; 560/26; 560/115; 560/158; 560/330; 560/336; 560/355; 560/358
[58] Field of Search .................. 528/61, 64, 76, 528/906, 77; 560/26, 115, 158, 330, 336, 355, 358

[56] References Cited

U.S. PATENT DOCUMENTS

| | | | |
|---|---|---|---|
| 3,180,854 | 4/1965 | Schneider et al. | 528/61 |
| 3,393,243 | 7/1968 | Cuscurida | 568/620 |
| 3,427,256 | 2/1969 | Milgrom | 502/150 |
| 3,427,334 | 2/1969 | Belher | 556/31 |
| 3,427,335 | 2/1969 | Herold | 549/206 |
| 3,829,505 | 8/1974 | Herold | 568/606 |
| 3,941,849 | 3/1976 | Herold | 528/92 |
| 3,963,681 | 6/1976 | Kaneko et al. | 528/61 |
| 4,282,387 | 8/1981 | Olstowsk et al. | 568/618 |
| 4,687,851 | 8/1987 | Laughner | 544/398 |
| 5,000,899 | 3/1991 | Dreibelbis et al. | 264/205 |
| 5,010,117 | 4/1991 | Herrington et al. | 521/159 |
| 5,010,187 | 4/1991 | Heuvelsland | 536/120 |
| 5,070,125 | 12/1991 | Heuvelsland | 528/71 |
| 5,077,371 | 12/1991 | Singh et al. | 528/64 |
| 5,096,993 | 3/1992 | Smith et al. | 528/61 |
| 5,106,874 | 4/1992 | Porter et al. | 528/64 |
| 5,114,619 | 5/1992 | Heuvelsland | 568/613 |
| 5,185,420 | 2/1993 | Smith et al. | 528/61 |
| 5,340,902 | 8/1994 | Smith et al. | 528/61 |
| 5,470,813 | 11/1995 | Le-Khac | 502/175 |
| 5,482,908 | 1/1996 | Le-Khac | 502/156 |
| 5,545,601 | 8/1996 | Le-Khac | 502/156 |
| 5,545,706 | 8/1996 | Barksby et al. | 528/49 |
| 5,563,221 | 10/1996 | Pazos | 525/409 |
| 5,589,431 | 12/1996 | Le-Khac | 528/76 |

OTHER PUBLICATIONS

Smith et al, "Thermoplastic Polyurethane Elastomers Made from High Molecular Weight Poly-L Polyols", Polyurethanes World Congress 1991; Sep. 26, 1991; pp. 313–318.

A.T. Chen et al., "Comparison of the Dynamic Properties of Polyurethane Elastomers Based on Low Unsaturation Polyoxypropylene Glycols and Poly9tetramethylene oxide) Glycols," Polyurethanes World Congress 1993, Oct. 10–13, 1993, pp. 388–399.

ASTM D–2849–69, "Testing Urethane Foam Polyol Raw Materials", pp. 913–931, 1969.

*Primary Examiner*—Rabon Sergent
*Attorney, Agent, or Firm*—Jonathan L. Schuchardt

[57] ABSTRACT

Substitution of from 5 to 50 equivalent percent of an ultra-low unsaturation polyoxypropylene diol for PTMEG in isocyanate-terminated prepolymers used in spandex production is found to lower considerably both prepolymer viscosity and hysteresis while substantially retaining other desirable physical properties. Such products may offer higher fiber production rates than are possible while employing an all PTMEG-derived polymer.

19 Claims, No Drawings

SPANDEX ELASTOMERS

TECHNICAL FIELD

The present invention pertains to aliphatic diamine-extended polyurethane/urea spandex-type elastomers. More particularly, the present invention pertains to aliphatic diamine-extended polyurethane/urea spandex-type elastomers prepared from prepolymers derived from admixtures of polytetramethylene ether glycols (PTMEG) and ultra-low unsaturation, high molecular weight polyoxyalkylene diols. The spandex elastomers exhibit surprisingly superior physical properties as compared to those prepared from conventional polyoxypropylene diols, low unsaturation polyoxypropylene diols, or from polytetramethylene ether glycol (PTMEG), the industry standard.

BACKGROUND ART

Polyurethane/urea elastomers in the form of fibers and films have found wide acceptance in the textile industry. The term "spandex", often used to describe these elastomers, refers to long chain synthetic polymers comprised of at least 85% by weight of segmented polyurethane. The term "elastane" is used in Europe. Spandex fibers are used for many different purposes in the textile industry, especially in underwear, form-persuasive garments, bathing wear, and elastic garments or stockings. The elastomeric fibers may be supplied as core spun elastomer yarns spun round with filaments or staple fiber yarns, or as staple fiber admixture to non-elastic fibers for the purpose of improving the wearing qualities of fabrics which are not in themselves highly elastic.

In the past, natural rubber thread was the only material available to provide elasticity to fabrics. Spandex, originally developed in the 1950s, has numerous advantages over rubber filaments. The most important of these is its higher modulus. Typically, for a given denier, spandex has at least twice the recovery, or retractive power, of rubber. This enables stretch garments to be manufactured containing less elastic fiber and thus be lighter in weight. Additional advantages over natural rubber include the ability to obtain spandex in much finer deniers, higher tensile strength and abrasion resistance, and in many cases, higher resilience. Additionally, spandex exhibits improved resistance to many cosmetic oils, to solvents, for example those used in dry cleaning, and a high resistance to oxidation and ozone as well. Furthermore, in contrast to rubber filaments, spandex fibers can be dyed relatively easily with certain classes of dyestuffs.

However, two areas where spandex fibers are inferior to rubber filaments are elongation and mechanical dynamic properties. PTMEG-based spandex fibers typically break at elongations of 500% while rubber filaments have elongations at break of 600 to 700%. In addition, rubber exhibits much lower hysteresis than PTMEG-based spandex fibers. Hysteresis is a measure of the energy loss during stretching and retraction of an elastic material. A large energy loss implies heat generation and thus discomfort in wear. So there is a need in the industry for an elastic fiber with both the positive features of spandex such as high retractive power and the positive features of rubber such as high elongation and low hysteresis.

Despite not having the elongation nor the low hysteresis of natural rubber, the improved retractive power and higher tensile strength, coupled with its ability to better withstand oxidative ageing, have made PTMEG-derived spandex the industry standard, this despite the difficulties associated with PTMEG-derived prepolymers and polymers, and the relatively high cost of PTMEG itself.

Another important physical property of elastic fibers is the "percent set" or "percent residual elongation," a measure of the fiber's ability to be stretched and then return to its original length. Any excess length is measured as percent set or residual elongation, and low values are desirable. Typical percent sets of PTMEG-derived spandex fibers are less than 30 percent, preferably less than 25 percent. It is particularly desirable to develop an elastic fiber with the positive features of PTMEG-derived spandex such as high retractive power, the positive features of rubber such as high elongation and low hysteresis, while retaining a low percent set.

The preparation of polyurethane elastomers by the polyaddition process from high molecular weight, substantially linear polyhydroxy compounds, polyisocyanates and chain lengthening agents which have reactive hydrogen atoms by reaction in a highly polar organic solvents is already known. The formation of fibers, filaments, threads, and films from these solvent-borne polyurethane elastomers and by reactive spinning is also known. Reference may be made to U.S. Pat. Nos. 3,483,167 and 3,384,623, which illustrate the preparation of spandex fibers from isocyanate-terminated polymeric diol-derived prepolymers.

As indicated previously, in commercial practice, the preferred polymeric diol is polytetramethylene ether glycol (PTMEG). It has been known for some time that in principle, polyoxypropylene glycol (polypropylene glycol; "PPG") could also be used to prepare spandex fibers. U.S. Pat. No. 3,180,854, for example, discloses a polyurethane/urea fiber based on a 2000 Da molecular weight polyoxypropylene glycol. However, spandex based on polyoxypropylene glycols of 2000 Da molecular weight or lower have inferior percent sets. Higher molecular weight polyoxypropylene glycols made by conventional processes contain high percentages of terminal unsaturation or monofunctional hydroxyl-containing species ("monol"). The monol is believed by many to act as a chain terminator, limiting the formation of the required high molecular weight polymer during the chain extension reaction and therefore yielding products generally inferior in comparison to PTMEG derived elastomers. However, the role of monol as a chain terminator may be over-simplified, as several patents, e.g. U.S. Pat. Nos. 3,384,623 and 4,098,772 disclose preparation of elastomers with enhanced physical properties by purposeful addition of monol to polyurethane elastomer formulations, and in the case of spandex-type, diamine extended polyurethane/urea elastomers, it is generally necessary to add monofunctional chain terminators to limit polymer molecular weight and solution viscosity.

Thus, the properties of polyoxypropylene-derived spandex are generally inferior to those based on PTMEG, and polyoxypropylene glycols have not been utilized commercially in spandex production. See, e.g., the POLYURETHANE HANDBOOK (Gunther Oertel, Ed., Carl Hanser Verlag Pub., Munich 1985, p. 578: "Polypropylene glycols have so far been used as soft segments only in experimental products since they produce inferior elastanes".

The majority of polyoxyalkylene polyether polyols are polymerized through base catalysis. For example, polyoxypropylene diols are prepared by the base catalyzed oxypropylation of a difunctional initiator such as propylene glycol. During base catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17–21. Unsaturation is measured in accordance with ASTM D-2849-69 "Testing Urethane Foam Polyol Raw Materials," and expressed as milliequivalents of unsaturation per gram of polyol (meq/g).

Due to the continual creation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4000 Da molecular weight, the content of monofunctional species may lie between 30 and 40 mol percent. In such cases, the average functionality is lowered to c.a. 1.6 to 1.7 from the nominal, or theoretical functionality of 2.0. In addition, the polyols have a high polydispersity, $M_w/M_n$ due to the presence of the substantial, low molecular weight fractions. Molecular weights and equivalent weights herein in Da (Daltons) are number average molecular weights and number average equivalent weights, respectively, unless specified otherwise.

Lowering unsaturation and the attendant large monol fraction in polyoxypropylene polyols has been touted as a means of providing polyurethane elastomers with improved properties. For example, use of polyols having low content of monofunctional species has been suggested as a method of increasing polymer molecular weight; and increased polymer molecular weight has, in turn, sometimes been cited as desirable in producing higher performance polymers. However, high molecular weight is not necessarily a desirable feature in many polymer systems. As indicated by G. Odian, PRINCIPLES OF POLYMERIZATION, John Wiley & Sons, ©1981, pp. 20–21, for example, often, the molecular weight to be desired is a moderate rather than a high molecular weight. In engineering thermoplastics, for example, higher molecular weights in general increase tensile strength, melt temperature, modulus, and the like, but if the molecular weight is too high, polymer viscosity becomes too great to process. In polyurethanes, molecular weights are far lower than engineering thermoplastics, and polymer morphology and physical properties are influenced by many factors, including amount and nature of hard segment, stereochemistry of isocyanate used, etc. Often, formulations must be chosen to balance conflicting properties. For example, increases in tensile strength are often accompanied by a decrease in elongation; and in the spinning of spandex polymer solutions, too high a molecular weight will increase the viscosity to such an extent that the solution may not be spinnable.

Reducing unsaturation in polyoxyalkylene polyols by lowering catalyst concentration and decreasing the reaction temperature is not feasible, as the reaction rate is so slow that oxypropylation takes days or even weeks, although low unsaturation polyols may be prepared in this manner. Thus, efforts have been expended to discover catalysts which can produce polyoxypropylated products in a reasonable amount of time with little introduction of monofunctionality due to allylic species. In the early 1960's, for example, double metal cyanide catalysts such as zinc hexacyano-cobaltate complexes were developed as illustrated by U.S. Pat. Nos. 3,427,256; 3,427,334; 3,427,335; 3,829,505; and 3,941,849. Despite lowering unsaturation to the range of c.a. 0.018 meq/g, the cost of these catalysts coupled with the necessity of lengthy and expensive catalyst removal steps prevented commercialization.

Use of alternative basic catalysts such as cesium hydroxide and rubidium hydroxide as disclosed in U.S. Pat. No. 3,393,243, and the barium and strontium oxides and hydroxides, as disclosed in U.S. Pat. Nos. 5,010,187 and 5,114,619, enabled modest improvements in unsaturation, however catalyst expense, and in some cases, toxicity, coupled with the but modest improvements offered, mitigated against commercialization. Catalysts such as calcium naphthenate and combinations of calcium naphthenate and tertiary amines have proven successful, as disclosed in U.S. Pat. Nos. 4,282,387, 4,687,851 and 5,010,117, in preparing polyols with unsaturations as low as 0.016 meq/g, and more generally in the range of 0.02 to 0.04 meq/g.

In the 1980's, double metal cyanide complex (DMC) catalysts were once more revisited, and improvements in catalytic activity and catalyst removal methods encouraged one manufacturer to offer DMC catalyzed polyols having low unsaturations in the range of 0.015 to 0.018 meq/g commercially for a brief time. However, base catalysis continued to be the major method of preparing polyoxypropylene polyols, and continues its dominance to the present day.

Recently, however, further major advances in DMC catalysts and polyoxyalkylation processes by the ARCO Chemical Co. have enabled practical preparation of ultra-low unsaturation polyoxypropylene polyols. High molecular weight polyols, for example those in the 4000 Da to 8000 Da molecular weight range, typically exhibit unsaturation in the range of 0.004 to 0.007 meq/g when catalyzed by the novel DMC catalysts. At these levels of unsaturation, the amount of monofunctional species is only 2 mol percent or less. Moreover, GPC analysis shows the polyols to be virtually monodisperse, often exhibiting polydispersities less than 1.10. Several such polyols have recently been commercialized as ACCLAIM™ polyols. The ultra-low unsaturation polyols have been found to be quantitatively different than both conventional polyols and low unsaturation polyols.

For example, Smith et al. U.S. Pat. No. 5,340,902 discloses spandex fibers prepared from polyoxypropylene diols having low unsaturation, less than 0.03 meq/g. Use of low unsaturation polyoxypropylene diols is stated therein to allow preparation of fibers with properties superior to PTMEG-derived spandex fibers. However, all the examples appear to be prophetic, and no physical properties are given. Moreover, 2000 Da and 4000 Da molecular weight polyoxypropylene glycols with unsaturations of 0.015 meq/g as suggested for use by Smith in his "examples" lead to inferior spandex elastomers. In the case of 2000 Da molecular weight diols, even ultra-low unsaturation diols do not provide suitable elastomers. Reference may be had to Comparative Example C-3 in this regard, where a 2000 Da ultra-low unsaturation diol-derived spandex had much lower retractive power and an unacceptable percent set as compared to a spandex prepared from 2000 Da molecular weight PTMEG.

In the publication co-authored by Smith which is substantially contemporaneous with the Smith patent: A. T. Chen et al., "Comparison of the Dynamic Properties of Polyurethane Elastomers Based on Low Unsaturation Polyoxypropylene Glycols and Poly(tetramethylene oxide) Glycols," POLYURETHANES WORLD CONGRESS 1993, Oct. 10–13, 1993, pp. 388–399, conventional, base-catalyzed polyoxypropylene diols having normal (high) levels of unsaturation produced polyurethane/urea cast elastomers with physical properties virtually indistinguishable from those prepared from low unsaturation diols, as demonstrated by an actual comparison of physical properties of PTMEG-derived elastomers with those from conventional polyoxypropylene diols and low unsaturation polyoxypropylene diols. In Shore A 90 cast elastomers, PTMEG-MDI prepolymer-derived, butanediol-extended polyurethane elastomers had slightly lower modulus and elongation than low unsaturation polyoxypropylene diol-derived elastomers, however tensile strength of the PTMEG elastomers was considerably higher. For polyurethane/urea cast elastomers, a direct comparison was not possible, as the only PTMEG example used a 1000 Da PTMEG while both low unsaturation polyoxypropylene diol examples employed c.a. 2000 Da molecular weight diols. The PTMEG example had considerably higher physical properties with the exception of elongation, which was lower as expected due to the lower soft segment molecular weight. These results must be viewed with caution, however, as it is known that the physical properties of spandex-type elastomers cannot be compared to cast or one shot elastomers.

PTMEG is a solid at room temperature and yields MDI prepolymers of extremely high viscosity. Additionally, the spandex produced from PTMEG-derived prepolymers has relatively low elongation, about 500%, and exhibits high hysteresis in comparison to rubber. Yet, despite the inherent difficulties of handling PTMEG and the unsatisfactory elongation and hysteresis, PTMEG continues to be the mainstay of spandex production.

Heretofore, it had been believed that any increases in physical properties of spandex-type polyurethane/urea elastomers obtained through use of low unsaturation polyoxypropylene polyols, i.e. those with unsaturations of c.a. 0.015 meq/g, had been maximized, and that little further improvement was possible. The reason for this belief was due to the fact that monofunctional species, i.e. monols or monoamines, are generally added to the solution-processed, isocyanate-terminated prepolymers during diamine chain extension to limit the molecular weight of the polyurethane/urea elastomer and hence the spinning solution viscosity. Thus, obtaining a product of exceptionally high molecular weight is not a goal, and the further elimination of unsaturation with its attendant higher functionality was thought not to affect the final polymer, only shifting molecular weight limitation from prepolymer formation to polymer formation.

It would be desirable to provide spandex elastomers with improved physical properties, particularly with respect to percent set, hysteresis, and prepolymer viscosity, while maintaining other physical properties. It would be yet further desirable to provide spandex elastomers based in part on less expensive and easier to handle polyoxypropylene glycols which exhibit improved properties as compared to wholly PTMEG-based elastomers. It would be still further desirable to provide prepolymers of high molecular weight but which display low neat and solution viscosities so as to allow for higher solids content in spinning solutions, enabling higher throughput.

SUMMARY OF THE INVENTION

It has now been surprisingly discovered that spandex elastomers based on isocyanate-terminated prepolymers derived from a polyol component comprising in most major part, an admixture of one or more PTMEGs and one or more ultra-low unsaturation polyoxypropylene glycols having molecular weights greater than about 1500 Da results in unexpected improvement in percent set, prepolymer viscosity, and most particularly, hysteresis, while substantially retaining retractive power and tensile strength. The increase in physical properties through use of ultra-low unsaturation polyoxypropylene glycols together with PTMEG is particularly surprising in view of the fact that amine-cured cast elastomers based on low unsaturation polyols disclosed in the prior art show virtually no improvement in physical properties as compared to elastomers prepared from conventional, "high" unsaturation polyols or to PTMEG-derived elastomers. Moreover, the novel prepolymers display lower prepolymer and polymer solution viscosities than PTMEG-derived prepolymers of the same solids content. This lower viscosity allows the solids content to be raised while retaining processability, thereby increasing fiber throughput.

DESCRIPTION OF THE PREFERRED EMBODIMENT

The spandex-type elastomers of the subject invention must be prepared by a prepolymer process. In such processes, a polyol component, generally composed essentially of diols, is reacted with an excess of diisocyanate, to yield an isocyanate-terminated prepolymer containing a relatively low isocyanate content. Isocyanate contents of from 0.5–10%, preferably from 2–4%, are preferred. The prepolymers are then chain extended in solution with an aliphatic or cycloaliphatic diamine to form the final elastomer. Extrusion of the prepolymer into a water bath containing a diamine chain extender is used occasionally, the diamine being far more reactive than water. Solvents other than water may be used as well, e.g. toluene. The latter process is generally termed the reactive spinning process.

Spandex elastomers prepared by chain extension in solution using isocyanate-terminated prepolymers or by the reactive spinning process cannot be compared with elastomers prepared by one-shot or quasi-prepolymer processes, as both of the latter introduce a significant amount of randomness in the polymer structure. Furthermore, neat processes cannot be used with aliphatic and cycloaliphatic diamines as the reactivity of these diamines is far too fast. The unusual strength and elongation properties of spandex-type elastomers are believed due to the uniform distribution of hard segments within the polymer matrix and to the very polar aliphatic urea hard segments they contain. These hard segments are believed to interact with one another through hydrogen bonding and, in some cases, crystallinity, and behave like cross-links or reinforcing fillers. Those skilled in the art of spandex polymers are aware of the processes used for their preparation. Reference may be made, for example, to U.S. Pat. Nos. 3,384,623; 3,483,167; and 5,340,902, which are herein incorporated by reference.

In the commercial production of spandex fibers by spinning from aprotic solvent, solvent removal is the rate limiting step. Due to the high viscosity of PTMEG-derived polymer solutions, solution solids are generally limited to a maximum of 25 to 30 weight percent or thereabouts, and thus considerable solvent must be removed from the spun fibers. Polar aprotic solvents tend to have relatively low volatility, and thus removal of some 80% of solvent from the spun fiber strands is a real impediment to increased fiber production rate. It has surprisingly and unexpectedly been found that prepolymer viscosities of the prepolymers of the subject invention are considerably lower than those of otherwise similar prepolymers based on PTMEG. As polymer solution viscosities often parallel prepolymer viscosities, the subject invention prepolymers offer the possibility of increased throughput.

Both aliphatic and aromatic di- and polyisocyanates may be used to prepare the spandex prepolymers. In general, diisocyanates are preferred, however it is within the scope of the invention to include a minor amount, i.e., not more than approximately 20 mol percent, of a tri- or higher-functionality isocyanate. Preferred isocyanates are identified in the references previously cited, and by way of example, but not by way of limitation, include linear aliphatic isocyanates such as 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2, 2,4-trimethylpentane, 3-oxo-1,5-pentane diisocyanate, and the like; cycloaliphatic diisocyanates such as isophorone diisocyanate, the cyclohexane diisocyanates, preferably 1,4-cyclohexane diisocyanate, fully hydrogenated aromatic diisocyanates such as hydrogenated tetramethylxylylene diisocyanate, hydrogenated toluene diisocyanates, and hydrogenated methylene diphenylene diisocyanates; and aromatic diisocyanates such as the toluene diisocyanates, particularly the 2,4-isomer, the methylene diphenylene diisocyanates, particularly 4,4'-methylene diphenylene diisocyanate (4,4'-MDI), tetramethylxylylene diisocyanate, and the like. Less preferred aromatic diisocyanates include the polymethylene polyphenylene polyisocyanates having functionalities greater than two. Also preferred are modified diisocyanates prepared by reacting one or more diisocyanates with themselves, or with a low molecular weight isocyanate reactive compound to form urea-modified, urethane-modified, carbodiimide-modified, allophanate-modified, uretonimine-modified, biuret-modified, and other modified isocyanates, many of which are commercially available. Particularly preferred is 4,4'-MDI.

A critical component of the spandex elastomer of the subject invention is the polyol component used to prepare the isocyanate-terminated prepolymer. This polyol component must comprise one or more high molecular weight, ultra-low unsaturation polyoxypropylene polyols, in admixture with one or more PTMEGs. The unsaturation of the high molecular weight polyoxypropylene polyol component is critical. This polyol component must comprise, in most major part, i.e., at least 70 weight percent based on the weight of the high molecular weight polyoxypropylene polyol component, of an ultra-low unsaturation polyoxypropylene polyol. Most preferably, the entire high molecular weight polyoxyalkylene polyol component has an unsaturation of less than 0.010 meq/g, more preferably less than 0.007 meq/g, and most preferably about 0.005 meq/g or lower. However, it would not depart from the spirit of the invention to include a minor portion of high molecular weight polyoxypropylene polyol which has a somewhat higher unsaturation, for example, but not by way of limitation, up to about 30 weight percent of a polyoxypropylene polyol having an unsaturation of about 0.015 to 0.020 meq/g. In such cases, the actual unsaturation of the high molecular weight polyoxypropylene polyol component should still be about 0.010 meq/g or lower. However, as long as the most substantial part, i.e., 70 weight percent or more, of the high molecular weight polyoxypropylene polyol component comprises an ultra-low unsaturation polyoxypropylene diol, the beneficial results of the invention may be obtained.

Thus, by the term "ultra-low unsaturation polyoxypropylene glycol," is meant a polymer glycol prepared by oxypropylating a dihydric initiator with propylene oxide in the presence of a catalyst such that the total unsaturation of the polyol product is less than 0.010 meq/g. Preferably, the catalyst is a double metal cyanide catalyst such as those disclosed in U.S. Pat. Nos. 5,470,813 and 5,482,908. Through the use of the catalysts disclosed in these references, unsaturations in the range of 0.004 to 0.008 are routinely achieved. The polyoxypropylene glycol may contain oxyethylene moieties distributed randomly or in block fashion. If the oxyethylene moieties are contained in a block, the block is preferably a terminal block. However, randomly distributed oxyethylene moieties are preferred when such moieties are present. In general, the polyoxypropylene glycol should contain about 30 weight percent or less of oxyethylene moieties, preferably 20 percent or less, and more preferably about 10 percent or less. The polyoxypropylene glycol may also contain higher alkylene oxide moieties such as those derived from 1,2- and 2,3-butylene oxide and other higher alkylene oxides, or oxetane. The amount of such higher alkylene oxides may be as much as 10–30% by weight of the polyoxypropylene polyol. However, preferably, the polyoxypropylene polyol is substantially derived from propylene oxide or propylene oxide in admixture with minor amounts of ethylene oxide. All such glycols containing a major portion of oxypropylene moieties are considered polyoxypropylene glycols as that term is used herein.

The high molecular weight, ultra-low unsaturation polyoxypropylene glycol has a molecular weight about 1500 Da or greater, preferably at least about 2000 Da, and may range up to 20,000 Da or higher. Preferably, the molecular weight is in the range of 3000 Da to 8,000 Da, and more preferably in the range of 4000 Da to 8000 Da. Molecular weights and equivalent weights herein are number average molecular weights and equivalent weights unless specified otherwise. It is possible to use a blend of more than one high molecular weight polyoxypropylene polyol, or to add low molecular weight diols in minor quantity. However, when such blends are used, the average molecular weight of the blend of high molecular weight components should be at least 1500 Da and otherwise within the ranges previously stated. The polyoxypropylene glycol component further may include minor amounts of higher functionality polyols, particularly non-oligomeric polyoxypropylene triols and polyoxypropylene tetrols having molecular weights greater than 500 Da, which may be advantageously added to adjust the viscosity or the spinnability of the prepolymer or prepolymer solution. Preferably, the prepolymers are prepared from substantially all difunctional polyols, i.e., are polyoxypropylene glycol-derived. The term "polyoxypropylene glycol" as used herein includes a minor amount, i.e., up to about 20 weight percent or more of a high molecular weight, ultra-low unsaturation triol or tetrol.

The polytetramethylene ether glycol (PTMEG) utilized herein has a molecular weight of greater than 600 Da and preferably greater than 1000 Da. Most preferably, PTMEGs in the range of 1300 Da to 3000 Da are used. It should be noted that molecular weights and equivalent weights expressed herein in Daltons (Da) are number average molecular weights and equivalent weights unless otherwise specified.

The PTMEGs are prepared by traditional methods, i.e. by the Lewis acid catalyzed polymerization of tetrahydrofoam. Suitable polymerization catalysts are, for example, anhydrous aluminum chloride, and particularly boron trifluoride.etherate. Such catalysts are well known and are the subject of numerous patents and publications. PTMEG polyols are commercially available in a variety of molecular weights from numerous sources, for example as Terathane® polyols from DuPont; as PolyTHF from BASF Corporation; and as POLYMEG® from QO Chemical, Inc. Most preferably, the PTMEG has a number average molecular weight between 600 and 6000 Da, preferably between 1000 Da and 4000 Da, and most preferably between 1300 and 3000 Da.

The polyol component used herein contains predominately a diol component, the diol component comprising preferably from about 95 equivalent percent to about 50 equivalent percent PTMEG, and more preferably from about 95 equivalent percent to about 65 equivalent percent PTMEG, the remainder of the diol component preferably being a polyoxypropylene diol component having an average unsaturation of less than about 0.010 meq/g, preferably less than about 0.007 meq/g, and most preferably about 0.005 meq/g or lower. By the term "in most major part" and like terms is meant about 85% by weight or more relative to the weight of the polyol component.

It would not depart from the spirit of the invention to further include polyoxypropylene diols outside this molecular weight range, as long as the overall average unsaturation is about 0.010 meq/g or lower. For example, it would be acceptable to provide a mixture containing c.a. 50 mol percent of ultra-low unsaturation polyoxypropylene diol having an unsaturation of about 0.007 meq/g or less with about c.a. 50 mol percent of a low unsaturation polyoxypropylene diol having an unsaturation of about 0.015 meq/g. Normally catalyzed, i.e. base catalyzed diols of higher unsaturation could, of course, be used in lesser quantities.

The diol component thus comprises one or more PTMEG diols and one or more polyoxyalkylene diols such that the average unsaturation of the polyoxyalkylene diol portion of the diol component is less than about 0.010 meq/g. The polyol component comprises the diol component and any other hydroxyl or other reactive functional species which, together with the diol component, will form the isocyanate-terminated prepolymer following reaction with the isocyanate component. Preferably, the components of the polyol component other than the PTMEG and polyoxypropylene diols may comprise one or more low molecular weight glycols or their oxyalkylated oligomers, or one or more triols, tetrols, or the like, or their oxyalkylated oligomers. Triols and higher functional monomeric polyols and their polyoxyalkylated oligomers, i.e. those up to a molecular weight of c.a. 500 Da., may be used to provide improved processing. This is particularly true when the reactive spinning process is utilized, as described hereafter, where up to 10–15 weight percent, preferably from up to about 10 weight percent, and more preferably up to about 7 weight percent of the polyol component may comprise a low molecular weight polyol, particularly a monomeric polyol such as glycerol or trimethylolpropane.

The polyol component is reacted with in excess of the desired diisocyanate, preferably under a nitrogen atmosphere at slightly elevated temperature, i.e., between 50° C. and 100° C., more preferably between 60° C. and 90° C. The amount of excess isocyanate is selected so as to provide a % NCO group content in the prepolymer of between about 0.5 weight percent and 10 weight percent, preferably between 1 weight percent and 4 weight percent, more preferably between 1.5 weight percent and 4 weight percent, and most preferably between about 2 and 4 weight percent. The reaction of the isocyanate with the polyol may be catalyzed with standard catalysts such as dibutyltin dilaurate, but may take place without catalysis. In general, the reaction proceeds until the point where the isocyanate content becomes constant. The isocyanate-terminated prepolymer is then generally dissolved in a polar aprotic solvent such as dimethyl acetamide, dimethyl formamide, dimethyl sulfoxide, N-methylpyrrolidone, or the like, and then chain-extended with a diamine as discussed, and as further discussed in the references cited previously. By the term "polar aprotic solvent" as used herein is meant a solvent having the capability to dissolve the chain extended polyurethane at the desired concentration while being essentially non-reactive to isocyanate groups.

The reaction spinning process accounts for a minor amount of spandex production, however, the prepolymers of the subject invention are well suited for use therein also. In reaction spinning, the isocyanate-terminated prepolymer itself is spun into strands, which are then passed into a bath containing diamine chain extender. While water solutions of aliphatic diamines have been used, it is generally more expedient to dissolve the diamine chain extender in a more volatile solvent such as toluene. Since the prepolymer itself is being spun in the reaction spinning process, prepolymer viscosity must be kept high to prevent dissipation of prepolymer into the solvent and to prevent strand breakage. To achieve the necessary high viscosity, up to about 10 weight percent of the entire polyol component of the prepolymer, preferably about 2–7 weight percent of the polyol component, may be replaced with a low molecular weight triol such as glycerine or trimethylolpropane or their lower oxyalkylated oligomers. The addition of these amounts causes a large increase in prepolymer viscosity, rendering the prepolymer spinnable.

The polymer thus obtained has both hard and soft segments. The terms "soft segment" and "hard segment" refer to specific portions of the spandex polymer chains. The soft segments are the polyether-based portions of the segmented polyurethane/urea polymer, derived from the PTMEG and the polyoxypropylene glycol. The hard segments refer to the portions of the polymer chains that are derived from the diisocyanate and chain extender. The term "NCO content" refers to the isocyanate group content of the prepolymer, before chain extension. The term "molecular weight" means number average molecular weight unless indicated otherwise. The number average molecular weights for the polyether glycols are each determined from the hydroxyl number of the polyether glycol as measured by the imidazole-pyridine catalyst method described by S. L. Wellon et al., "Determination of Hydroxyl Content of Polyurethane Polyols and Other Alcohols", ANALYTICAL CHEMISTRY, Vol. 52, NO. 8, pp. 1374–1376 (July 1980).

Suitable chain extenders include, but are not limited to, ethylene diamine, 1,3-propylene diamine, hydrazine, piperazine, tetramethylene diamine, cyclohexylene-1,3-diamine (hydrogenated m-phenylene diamine), isophorone diamine, or mixtures of these diamines. Preferred are mixtures containing ethylene diamine as the major component. Ethylene diamine as the sole chain extender is particularly preferred. Other diamine chain extenders useful in the present invention include diethyltoluene diamine, 1,4-diamino-2-methylpiperazine, 1,4-diamino-2,5-dimethylpiperazine, and methyl bis-propylamine, substituted aromatic diamines such as the product commercially available as UNI-LINK 4200, a product of UOP, Inc., N,N-bis(2-hydroxypropyl)aniline commercially available as ISONOL 100, a product of Dow Chemical Corporation, and combinations thereof. The amount of aromatic diamines used, if any, should be minimal. Preferably, the entire diamine component is substantially aliphatic or cycloaliphatic. By the term "substantially aliphatic or cycloaliphatic" is meant that at least about 70 mol percent of total diamine chain extender is an aliphatic diamine and/or a cycloaliphatic diamine. Minor portions of diol chain extenders such as those traditionally used in other elastomers may be added under appropriate circumstances, particularly to adjust polymer viscosity. Such diol chain extenders include ethylene glycol, propylene glycol, 1,4- butanediol, 1,6-hexanediol, diethylene glycol, dipropylene glycol, and the like.

Chain terminators are generally included in the reaction mixture to adjust the final molecular weight, and thus the intrinsic viscosity, of the polyurethane/urea polymer to the desired value. Usually, the chain terminators are monofunctional compounds such as secondary amines, for example diethylamine or dibutylamine, or hydroxyl or thiol functional compounds such as n-butanol or dodecanethiol. The terminator content is adjusted such that the resultant spandex polymer dissolved in a polar aprotic solvent preferably has a viscosity in the range of 100 to 10,000 poise at 25° C., more preferably 150 to 5000 poise at approximately 10–50% solids, preferably 25–45% solids. The polymer should have an intrinsic viscosity in the range of 0.75 to 2.5 dL/g, preferably 1.0 to 1.8 dL/g, when measured at 25° C. in N,N-dimethylacetamide at a concentration of 0.5 grams per 100 milliliters of solution.

Having generally described this invention, a further understanding can be obtained by reference to certain specific examples which are provided herein for purposes of illustration only and are not intended to be limiting unless otherwise specified.

Procedure Used For Preparing Spandex Used in Examples

The following procedure was used to prepare the elastic polymer. The polyol component was mixed with 4,4'-diphenylmethane diisocyanate (4,4-'MDI) and heated for about 8 hours at 80° C. to yield the appropriate isocyanate-terminated polyether prepolymer (i.e., isocyanate capped glycol). The prepolymer was then mixed with dimethylacetamide (DMAc) for about 2 minutes to form a solution containing about 21.3% solids. Then, while the prepolymer solution was still being mixed, a mixture of ethylene diamine (EDA) chain extender and diethylamine (DEA) chain terminator dissolved in additional DMAc was added to the isocyanate-terminated polyether prepolymer solution and the resulting reaction formed the desired segmented polyurethane/urea. The additional amount of DMAc decreased the solids concentration of the resultant solution to about 20% by weight of the total solution.

Films were cast onto glass plates from the polymer solution. The films were dried and cut with a die into 0.25" wide strips. Elastic properties of spandex films were measured in general accord with the procedures described in ASTM D 2731-72. This method was designed mainly for the testing of elastic threads and yarns rather than films. However, the parameters tested by this method are those commonly used to evaluate the elastic properties of spandex. Tests were run on a constant-rate-of-extension type tensile testing machine with a load capacity of 50 N (11.2 lb). The samples were gripped by pneumatically operated clamps. In order to avoid tearing at the grips, films were sandwiched between two pieces of self-fusing Okonite No. 35 Jacketing Tape.

For the examples, sample strips of 0.25 inch width and 2.5 inch gauge length were cycled five times between the limits of 0 to 300% elongation. On the fifth cycle, the specimen was held in the extended state for 30 seconds before returning the crosshead. On the return cycle after holding at 300% elongation for 30 seconds, the crosshead was returned and the forces at 300, 200 and 100% elongation were recorded. By dividing the force at each of these points by the initial film cross-sectional area, the unload power or retractive power was calculated for each of these points. In order to calculate % set, 30 seconds after completion of the fifth cycle, the crosshead was slowly lowered until visible slack was just removed from the film. The extension was recorded to the nearest 0.01". Set, as calculated from the following formula, is defined as the difference between the original and final length, expressed as a percentage of the original length.

Set, in percent=[(Final Length-Initial Length)/Initial Length]* 100

Fiber or film made from spandex polymer according to the invention generally has a set of no greater than 30%.

EXAMPLES 1 and 2 and Comparative Examples C-1

Spandex With Improved Properties Obtained From PTMEG-2000/4000 MW Ultra-Low Unsaturation Polyol Blends (Comparison at Equal NCO/OH Ratio)

The table and figure below compare spandex based on 2000 Da molecular weight polytetramethylene ether glycol (PTMEG-2000) blended with a 4000 Da molecular weight ultra-low unsaturation polyoxypropylene polyol prepared according to the invention to a spandex based on a 2000 Da molecular weight polytetramethylene ether glycol (PTMEG-2000) which is considered the "standard of the industry."

TABLE 1

Effect of 4000 MW Ultra-Low Monol PPG Addition to a Spandex Formulation Based on PTMEG-2000

| Example | Wt % PPG-4000 | NCO/OH | % NCO | UP @ 100% (psi) | UP @ 200% (psi) | % Set | Area | % Area Reduction | Prepolymer Viscosity @ 80° C. (cps) |
|---|---|---|---|---|---|---|---|---|---|
| C-1 | 0 | 1.7 | 2.30 | 240 | 340 | 20 | 47100 | — | 21400 |
| 1 | 10 | 1.7 | 2.18 | 240 | 320 | 16 | 36700 | 22 | 11100 |
| 2 | 40 | 1.7 | 1.91 | 210 | 350 | 19 | 20600 | 56 | 8700 |

NCO: NCO content (wt. %) of the prepolymer.
UP @ 100%: 5th cycle unload (retractive) power at 100% elongation.
UP @ 200%: 5th cycle unload (retractive) power at 200% elongation.
% Set = percent residual elongation after 5th cycle to 300% elongation.
Area = Area between the load and unload curves (psi %) - Indicates the amount of hysteresis.
% Area = Indicates the percentage decrease of the hysteresis.

The results of Table 1 illustrate the surprising and unexpected improvement offered by the present invention. The addition of only 10 percent by weight (~5 equivalent percent) of a 4000 Da molecular weight, ultra-low unsaturation polyoxypropylene diol to the industry standard 2000 m.w. PTMEG resulted in a 22% decrease in hysteresis and approximately a 50% reduction in prepolymer viscosity. As polymer solution viscosity is often directly related to prepolymer viscosity in spandex elastomers, the lower viscosity reflects the opportunity to increase the solids content of the spinning solution. Solvent removal from the spun fibers is a limiting step in fiber production. The ability to prepare higher solids content spinning solutions may be used to increase fiber throughput. Note that despite the improvements in hysteresis and prepolymer viscosity, the unload power was virtually unchanged, showing only a very slight reduction at 200% elongation. The percent set was improved slightly.

Table 1 also shows that addition of 40 weight percent of the same ultra-low unsaturation diol results in a 56% improvement in hysteresis, a yet further decrease in prepolymer viscosity, with little change in unload power, the retractive power at 100% elongation being somewhat less while that at 200% elongation is slightly more.

EXAMPLE 2 and Comparative Example C-2

Spandex Based on PTMEG-2000/PPG-4000 Blends: Effect of Monol Content (Comparison at Equal NCO/OH Ratio)

Da molecular weight polyoxypropylene glycol to PTMEG prior to prepolymer formation produces a spandex with noticeably lower hysteresis and considerably lower prepolymer viscosity while substantially retaining unload power and percent set. Substitution of the same ultra-low unsaturation polyol for all the PTMEG produces a spandex with yet lower hysteresis and prepolymer viscosity. However, the unload power is considerably reduced, and the percent set unacceptable. This spandex would not be a useful commercial product.

EXAMPLE 4 and Comparative Examples C-1, C-4, and C-5

Spandex Based PTMEG-2900/PPG Blends: Effect of PPG Molecular Weight (Comparison at Equal % NCOs)

TABLE 2

| Example | Wt % PPG-4000 | PPG-4000 Unsaturation (meq/g) | NCO/OH | % NCO | UP @ 100% (psi) | UP @ 200% (psi) | % Set | Area | Tensile Strength (psi) |
|---|---|---|---|---|---|---|---|---|---|
| 2 | 40 | 0.005 | 1.7 | 1.91 | 210 | 350 | 19 | 20600 | 8740 |
| C-2 | 40 | 0.078 | 1.7 | 1.82 | 160 | 260 | 20 | 18600 | 5000 |

In Table 2, the effect of unsaturation of the polyoxypropylene glycol (PPG) is shown. In Example 2, the admixture of ultra-low unsaturation polyoxypropylene diol with PTMEG produced a spandex elastomer having unload power similar to that of the industry standard PTMEG as shown in Table 1 However, Comparative Example 2 spandex, prepared from an admixture of PTMEG and a conventionally catalyzed polyoxypropylene diol having an unsaturation of 0.078 meq/g produced a spandex with markedly inferior unload power and tensile strength.

EXAMPLE 3 and Comparative Examples C-1 and C-3

Spandex Based On PTMEG-2000/PPG-2000 Blends: Effect Of Blend Ratio

TABLE 3

| Example | Wt % PPG-2000 | PPG-2000 Unsaturation (meq/g) | NCO/OH | % NCO | UP @ 100% (psi) | UP @ 200% (psi) | % Set | Area | % Area Reduction | Prepolymer Viscosity @ 80° C. (cps) |
|---|---|---|---|---|---|---|---|---|---|---|
| C-1 | 0 | N/A | 1.7 | 2.30 | 240 | 340 | 20 | 47100 | — | 21400 |
| 3 | 40 | 0.005 | 1.7 | 2.30 | 200 | 340 | 23 | 24700 | 48 | 6600 |
| C-3 | 100 | 0.005 | 1.7 | 2.32 | 120 | 310 | 37 | 17500 | 63 | 3000 |

In Table 3, the effects of blend ratio are presented. The addition of 40 weight percent ultra-low unsaturation 2000

TABLE 4

| Example | Polyol(s) | Wt % PPG | Unsaturation (meq/g) | % NCO | UP @ 100% (psi) | UP@ 200% (psi) | % Set | Area | % Area Reduction | Tensile Strength (psi) | Prepolymer Viscosity @ 80° C. (cps) |
|---|---|---|---|---|---|---|---|---|---|---|---|
| C-1 | PTMEG-2000 | N/A | N/A | 2.30 | 240 | 340 | 20 | 47100 | — | 11000 | 21400 |
| 4 | PTMEG-2900/ PPG-2000 | 20 | 0.005 | 2.24 | 230 | 310 | 16 | 32600 | 31 | 8700 | 10500 |
| C-4 | PTMEG-2900/ PPG-425 | 8 | 0.002 | 2.30 | 220 | 280 | 15 | 40900 | 13 | 10200 | 18500 |

TABLE 4-continued

| Example | Polyol(s) | Wt % PPG | Unsaturation (meq/g) | % NCO | UP @ 100% (psi) | UP@ 200% (psi) | % Set | Area | % Area Reduction | Tensile Strength (psi) | Prepolymer Viscosity @ 80° C. (cps) |
|---------|-----------|----------|----------------------|-------|-----------------|----------------|-------|------|------------------|------------------------|-------------------------------------|
| C-5 | PTMEG-2900/TPG | 3 | 0 | 2.24 | 220 | 280 | 13 | 44900 | 5 | 2900 | 22600 |

Table 4 indicates the effect of the molecular weight of the ultra-low unsaturation polyoxypropylene glycol. As can be seen, a molecular weight of 2000 Da provides for a significant reduction in hysteresis, percent set, and prepolymer viscosity, with some loss of tensile strength, while substantially maintaining unload power as compared to an all PTMEG-derived spandex. Use of a 425 Da molecular weight diol resulted in substantial maintenance of tensile strength and showed approximately the same percent set, however unload power is considerably lower, and prepolymer viscosity and hysteresis changed but little. Use of tripropylene glycol (TPG; molecular weight 192 Da) together with PTMEG exhibited considerable loss of unload power and virtually the same hysteresis and prepolymer viscosity. Tensile strength, however, is completely unacceptable. These examples were done at the same % NCO so as to be comparable.

Having now fully described the invention, it will be apparent to one of ordinary skill in the art that many changes and modifications can be made thereto without departing from the spirit or scope of the invention as set forth herein.

What is claimed is:

1. A segmented polyurethane/urea spandex elastomer prepared by reacting in solution:

a) an isocyanate-terminated prepolymer prepared by reacting a stoichiometric excess of one or more di- or polyisocyanates, so as to provide a free NCO group content of said prepolymer of from about 0.5% by weight to about 10% by weight based on prepolymer weight, with a polyol component comprising in most major part a diol component, said diol component comprising from about 5 equivalent percent to about 50 equivalent percent of one or more ultra-low unsaturation polyoxypropylene diols having a molecular weight in excess of about 1500 Da and an average unsaturation of less than about 0.010 meq/g, and from about 95 equivalent percent to about 50 equivalent percent of one or more polytetramethylene ether glycols having a molecular weight of from about 600 Da to about 6000 Da; with b) a diamine chain extender comprising one or more aliphatic diamines, cycloaliphatic diamines, or their admixture.

2. The elastomer of claim 1 wherein said isocyanate terminated prepolymer (a) is reacted with said chain extender (b) in a polar aprotic solvent followed by volatilization of said aprotic solvent.

3. The elastomer of claim 1 wherein said ultra-low unsaturation polyoxypropylene diol comprises from about 5 to about 35 equivalent percent of said diol component.

4. The elastomer of claim 1 wherein said ultra-low unsaturation diol has an average molecular weight of from about 2000 Da to about 8000 Da.

5. The elastomer of claim 1 wherein said polyol component further comprises one or more monomeric polyol(s) having a functionality of 3 or more, an oxyalkylated oligomer thereof, or a mixture of monomeric polyol(s) and oxyalkylated oligomer(s), said oxyalkylated oligomers having average molecular weights less than about 500 Da.

6. The elastomer of claim 1 wherein said isocyanate-terminated prepolymer (a) is reacted with said chain extender (b) by introducing said prepolymer into a solution of chain extender.

7. The elastomer of claim 6 wherein said solution of chain extender contains a volatile solvent.

8. The elastomer of claim 6 wherein said volatile solvent is selected from the group consisting of water and toluene.

9. A process for the reduction of PTMEG contained in the soft segments of segmented, polyurethane/urea spandex polymers while maintaining unload power or percent set, comprising substituting for from 5 equivalent percent to 50 equivalent percent of PTMEG one or more ultra-low unsaturation polyoxypropylene polyols having molecular weights from about 1500 Da to 20,000 Da and an average unsaturation less than 0.010 meq/g.

10. A process for the reduction of viscosity of isocyanate-terminated PTMEG prepolymers prepared by reacting a stoichiometric excess of one or more di- or polyisocyanates with PTMEG, comprising substituting for from 5 equivalent percent to about 50 equivalent percent of PTMEG with one or more ultra-low unsaturation polyoxypropylene diols having molecular weights in the range of about 1500 Da to about 20,000 Da and an average unsaturation of less than about 0.010 meq/g.

11. A process for the preparation of a segmented polyurethane/urea spandex elastomer, comprising reacting in solution in a solvent:

a) an isocyanate-terminated prepolymer prepared by reacting a stoichiometric excess of one or more di- or polyisocyanates, so as to provide a free NCO group content of said prepolymer of from about 0.5% by weight to about 10% by weight based on prepolymer weight, with a polyol component comprising in most major part a diol component, said diol component comprising from about 5 equivalent percent to about 50 equivalent percent of one or more ultra-low unsaturation polyoxypropylene diols having a molecular weight in excess of about 1500 Da and an average unsaturation of less than about 0.010 meq/g, and from about 95 equivalent percent to about 50 equivalent percent of one or more polytetramethylene ether glycols having a molecular weight of from about 600 Da to about 6000 Da; with b) a diamine chain extender comprising one or more aliphatic diamines, cycloaliphatic diamines, or mixtures thereof to form an aliphatic diamine and/or cycloaliphatic diamine chain extended spandex elastomer reaction product; and c) removing said solvent from said reaction product.

12. The process of claim 11 wherein said isocyanate terminated prepolymer (a) is reacted with said chain extender (b) in a polar aprotic solvent followed by volatilization of said aprotic solvent.

13. The process of claim 11 wherein said ultra-low unsaturation polyoxypropylene diol comprises from about 5 to about 35 equivalent percent of said diol component.

14. The process of claim 11 wherein said ultra-low unsaturation diol has an average molecular weight of from about 2000 Da to about 8000 Da.

15. The process of claim 11 wherein said polyol component further comprises one or more monomeric polyol(s) having a functionality of 3 or more, an oxyalkylated oligomer thereof, or a mixture of monomeric polyol(s) and oxyalkylated oligomer(s), said oxyalkylated oligomers having average molecular weights less than about 500 Da.

16. The process of claim 11 wherein said NCO group content is from about 1.5 weight percent to about 4 weight percent.

17. The process of claim 11 wherein said isocyanate-terminated prepolymer (a) is reacted with said chain extender (b) by introducing said prepolymer into a solution of chain extender.

18. The process of claim 17 wherein said solution of chain extender contains a volatile solvent.

19. The process of claim 17 wherein said volatile solvent is selected from the group consisting of water and toluene.

* * * * *